(12) United States Patent
Sullivan et al.

(10) Patent No.: US 10,376,748 B2
(45) Date of Patent: *Aug. 13, 2019

(54) GOLF BALLS COMPRISING A PLASTICIZED POLYURETHANE LAYER

(71) Applicant: Acushnet Company, Fairhaven, MA (US)

(72) Inventors: Michael J. Sullivan, Old Lyme, CT (US); David A Bulpett, Boston, MA (US); Robert Blink, Newport, RI (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,490

(22) Filed: Oct. 5, 2017

(65) Prior Publication Data

US 2018/0028874 A1 Feb. 1, 2018

Related U.S. Application Data

(62) Division of application No. 14/672,523, filed on Mar. 30, 2015, now Pat. No. 9,789,368.

(51) Int. Cl.

| | |
|---|---|
| *A63B 37/06* | (2006.01) |
| *A63B 37/00* | (2006.01) |
| *C08K 5/00* | (2006.01) |
| *C08L 75/04* | (2006.01) |
| *C08G 18/76* | (2006.01) |
| *C08K 5/101* | (2006.01) |
| *C08K 5/103* | (2006.01) |
| *C08K 5/1565* | (2006.01) |

(52) U.S. Cl.
CPC ...... *A63B 37/0092* (2013.01); *A63B 37/0031* (2013.01); *A63B 37/0043* (2013.01); *A63B 37/0044* (2013.01); *A63B 37/0045* (2013.01); *A63B 37/0058* (2013.01); *A63B 37/0062* (2013.01); *A63B 37/0063* (2013.01); *A63B 37/0064* (2013.01); *A63B 37/0075* (2013.01); *A63B 37/0076* (2013.01); *C08G 18/7614* (2013.01); *C08G 18/7621* (2013.01); *C08G 18/7671* (2013.01); *C08K 5/0016* (2013.01); *C08K 5/101* (2013.01); *C08K 5/103* (2013.01); *C08L 75/04* (2013.01); *C08K 5/1565* (2013.01)

(58) Field of Classification Search
CPC .................................. A63B 37/0039
USPC .................................. 473/373, 374
See application file for complete search history.

(56) References Cited

U.S. PATENT DOCUMENTS

| | | | | |
|---|---|---|---|---|
| 6,849,675 | B2 * | 2/2005 | Sullivan | C08L 75/04 473/371 |
| 7,053,142 | B2 * | 5/2006 | Sullivan | A63B 37/0003 473/374 |
| 9,522,305 | B2 * | 12/2016 | Sullivan | C08L 75/00 |
| 9,643,061 | B2 * | 5/2017 | Sullivan | A63B 37/0092 |
| 2016/0287947 | A1 * | 10/2016 | Sullivan | C08L 75/00 |

FOREIGN PATENT DOCUMENTS

CN 102876039 A 9/2012

* cited by examiner

*Primary Examiner* — Raeann Gorden
(74) *Attorney, Agent, or Firm* — Mandi B. Milbank

(57) ABSTRACT

A golf ball comprising a core and a cover layer, wherein at least one of the core or cover layer comprises a plasticized polyurethane composition comprising at least one polyurethane and at least one plasticizer.

4 Claims, No Drawings

GOLF BALLS COMPRISING A PLASTICIZED POLYURETHANE LAYER

CROSS-REFERENCE TO RELATED APPLICATIONS

This application is a division of U.S. patent application Ser. No. 14/672,523, filed Mar. 30, 2015, the entire disclosure of which is hereby incorporated herein by reference.

FIELD OF THE INVENTION

The present invention relates to multi-layer golf balls and, more particularly, to multi-layer golf balls having at least one layer formed from a plasticized polyurethane composition.

BACKGROUND OF THE INVENTION

Golf balls having multi-layer cores are well known. Also known are particular multi-layer cores having a thermoset center, thermoplastic intermediate core layer, and thermoset outer core layer, such as those disclosed in U.S. Pat. Nos. 7,708,656 and 8,262,511. Golf balls comprising a layer formed from a plasticized polyurethane composition are also known. For example, U.S. Pat. Nos. 6,849,675 and 7,053,142 disclose a golf ball core or cover layer formed from a plasticized polyurethane composition comprising at least one polyurethane and at least one plasticizer.

The present invention provides a novel multi-layer golf ball construction wherein a plasticized polyurethane composition is used to form a core layer in a multi-layer core construction.

SUMMARY OF THE INVENTION

The present invention is directed to a golf ball comprising a core having two or more layers and a cover, wherein at least one of the core layers is formed from a polyurethane composition comprising a plasticizer.

In one embodiment, the golf ball comprises a core and a cover, the core comprising an inner core layer and an outer core layer. In a particular aspect of this embodiment, the inner core layer is formed from a rubber composition; the outer core layer is formed from a composition comprising a polyurethane and from 2 wt % to 50 wt %, based on the total weight of the outer core layer composition, of a plasticizer; and the surface hardness of the outer core layer is greater than the center hardness of the inner core layer. In another particular aspect of this embodiment, the inner core layer is formed from a composition comprising a polyurethane and from 2 wt % to 50 wt %, based on the total weight of the inner core layer composition, of a plasticizer; the outer core layer is formed from a rubber composition; and the surface hardness of the outer core layer is greater than the center hardness of the inner core layer. In another particular aspect of this embodiment, the inner core layer is formed from a first thermoplastic composition and has a positive hardness gradient wherein the outer surface hardness of the inner core layer is greater than the center hardness of the inner core layer; and the outer core layer is formed from a second thermoplastic composition comprising a polyurethane and from 2 wt % to 50 wt %, based on the total weight of the outer core layer composition, of a plasticizer, and has a positive hardness gradient wherein the outer surface hardness of the outer core layer is greater than the midpoint hardness of the outer core layer. In another particular aspect of this embodiment, the inner core layer is formed from a thermoset composition and has a positive hardness gradient wherein the outer surface hardness of the inner core layer is greater than the center hardness of the inner core layer, and the outer core layer is formed from a thermoplastic composition comprising a polyurethane and from 2 wt % to 50 wt %, based on the total weight of the outer core layer composition, of a plasticizer, and has a positive hardness gradient wherein the outer surface hardness of the outer core layer is greater than the midpoint hardness of the outer core layer. In another particular aspect of this embodiment, the inner core layer is formed from a thermoset composition and has a positive hardness gradient wherein the outer surface hardness of the inner core layer is greater than the center hardness of the inner core layer, and the outer core layer is formed from a thermoplastic composition comprising a polyurethane and from 2 wt % to 50 wt %, based on the total weight of the outer core layer composition, of a plasticizer, and has a zero or negative hardness gradient wherein the outer surface hardness of the outer core layer is equal to or less than the midpoint hardness of the outer core layer In another embodiment, the golf ball comprises a core and a cover, the core comprising an inner core layer, an intermediate core layer, and an outer core layer. In a particular aspect of this embodiment, the inner core layer is formed from a first rubber composition and has a positive hardness gradient wherein the outer surface hardness of the inner core layer is greater than the center hardness of the inner core layer; the intermediate core layer is formed from a thermoplastic composition comprising a polyurethane and from 2 wt % to 50 wt %, based on the total weight of the intermediate core layer composition, of a plasticizer, and has a positive hardness gradient wherein the outer surface hardness of the intermediate core layer is greater than the midpoint hardness of the intermediate core layer; and the outer core layer is formed from a second rubber composition and has a positive hardness gradient wherein the outer surface hardness of the outer core layer is greater than the midpoint hardness of the outer core layer. In another particular aspect of this embodiment, the inner core layer is formed from a first rubber composition and has a positive hardness gradient wherein the outer surface hardness of the inner core layer is greater than the center hardness of the inner core layer; the intermediate core layer is formed from a thermoplastic composition comprising a polyurethane and from 2 wt % to 50 wt %, based on the total weight of the intermediate core layer composition, of a plasticizer, and has a zero or negative hardness gradient wherein the outer surface hardness of the intermediate core layer is equal to or less than the midpoint hardness of the intermediate core layer; and the outer core layer is formed from a second rubber composition and has a positive hardness gradient wherein the outer surface hardness of the outer core layer is greater than the midpoint hardness of the outer core layer.

DETAILED DESCRIPTION OF THE INVENTION

Golf balls of the present invention have at least one core layer formed from a plasticized polyurethane composition. Typically, the plasticized polyurethane composition comprises from 20 to 99.5 wt % of a polyurethane and from 0.5 to 80 wt % of a plasticizer, based on the combined weight of the polyurethane and the plasticizer. Suitable plasticized polyurethanes include thermosetting and thermoplastic polyurethanes.

Polyurethane

Suitable polyurethanes generally comprise the reaction product of at least one polyisocyanate, polyol, and at least one curing agent. Any polyisocyanate available to one of ordinary skill in the art is suitable for use according to the present invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophorone-diisocyanate ("IPDI"); hexamethylene diisocyanate ("HDI"); naphthalene diisocyanate ("NDP"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof, and that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups, or about 7.5% or less unreacted NCO groups, or less than about 7% unreacted NCO groups, or about 5% or less unreacted NCO groups, or less than about 5% unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols.

Suitable polyether polyols include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are suitable for use in polyurethane covers. Suitable polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives include both primary and secondary amines.

At least one of a diol, triol, tetraol, or hydroxy-terminated curative may be added to the polyurethane composition. Suitable diol, triol, and tetraol groups include, but are not limited to, ethylene glycol; diethylene glycol; polyethylene glycol; propylene glycol; polypropylene glycol; lower molecular weight polytetramethylene ether glycol; 1,3-bis (2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a single curing agent or a blend or mixture of curing agents.

In a particular embodiment, the polyurethane is a saturated (aliphatic) polyurethane.

Suitable saturated diisocyanates include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1, 3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI").

Suitable saturated polyols include, but are not limited to, polyether polyols such as polytetramethylene ether glycol and poly(oxypropylene) glycol. Suitable saturated polyester polyols include, but are not limited to, polyethylene adipate glycol, polyethylene propylene adipate glycol, polybutylene adipate glycol, polycarbonate polyol and ethylene oxide-capped polyoxypropylene diols. Suitable saturated polycaprolactone polyols include, but are not limited to, diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, and PTMEG-initiated polycaprolactone.

Suitable saturated curatives include, but are not limited to, 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propyl amine, imido-bis-propylamine, isomers and mixtures of isomers of diaminocyclohexane, monoethanolamine, diethanolamine, triethanolamine, monoisopropanolamine, and diisopropanolamine.

Suitable catalysts include, but are not limited to, bismuth catalyst, oleic acid, triethylenediamine (e.g., DABCO®-33LV catalyst), di-butyltin dilaurate (DABCO®-T12 catalyst) and acetic acid. DABCO® catalysts are commercially available from Air Products and Chemicals, Inc.

The plasticized polyurethane composition optionally comprises at least one additional polymer. Suitable additional polymers for blending with the plasticized polyurethane, include, but are not limited to, epoxy resins, polyethylenes, polyamides, polyesters, polycarbonates and polyacrylates.

Plasticized Polyurethane Composition

Plasticized polyurethane compositions of the present invention include a plasticizer in an amount sufficient to substantially change the stiffness and/or hardness of the polyurethane. In a particular embodiment, the plasticizer is present in an amount of 0.5% or 1% or 3% or 5% or 7% or 8% or 9% or 10% or 12% or 15% or 18% or 20% or 22% or 25% or 30% or 35% or 40% or 42% or 50% or 55% or 60% or 66% or 71% or 75% or 80%, by weight based on the combined weight of the polyurethane and the plasticizer, or the plasticizer is present in an amount within a range having a lower limit and an upper limit selected from these values.

Suitable plasticizers for blending with the above-mentioned polyurethane materials include, but are not limited to, those disclosed in U.S. Pat. No. 3,489,723, the entire disclosure of which is hereby incorporated herein by reference. Exemplary plasticizers include, but are not limited to, phthalic acid esters, e.g., dibutyl phthalate, dioctyl phthalate, butyl benzyl phthalate, di-isodecyl phthalate; aliphatic dibasic acid esters, e.g., di-2-ethyl hexyl adipate, 2-ethyl hexyl sebacate; trimellitate esters, e.g., tri-2-ethyl hexyl trimellitate, tri-ocytl trimellitate; fatty acid esters, e.g., butyl oleate; benzoic esters, e.g., diethylene glycol dibenzoate, dipropylene glycol dibenzoate, aliphatic phosphates, e.g., trimethyl phosphate, triethyl phosphate, tributyl phosphate, tri-2-ethyl hexyl phosphate, tributoxy phosphate; aromatic phosphates, e.g., triphenyl phosphate, tricresyl phosphate, trixylenyl phosphate, cresyl diphenyl phosphate, xylenyl diphenyl phosphate, 2-ethyl hexyl diphenyl phosphate, tris(2,6-dimethyl phenyl)phosphate, diphenyl phosphate-hydroquinone condensate ("HQDP"); halogenated aliphatic phosphates, e.g., tris(chloroethyl)phosphate, tris(β-chloropropyl) phosphate, tris(dichloropropyl) phosphate, tris(tribromoneopentyl) phosphate; carbonate esters, e.g. propylene carbonate and ethylene carbonate; polyglycols, e.g., polytetramethylene ether glycol; and mixtures of two or more thereof. In a particular embodiment, the plasticizer is selected from polytetramethylene ether glycol, e.g., PolyTHF™ 250, commercially available from BASF; propylene carbonate, e.g., Jeffsol™ PC propylene carbonate, commercially available from Huntsman Corp.; and dipropylene glycol dibenzoate, e.g., Benzoflex™ 284 plasticizer, commercially available from Eastman Chemical; and combinations of two or more thereof.

The plasticizer may be a hydrophobic plasticizer, including, but not limited to, aromatic esters, such as dibutyl phthalate, dioctyl phthalate, diheptyl phthalate, bis (2-ethylhexyl) phthalate, dicyclohexyl phthalate, butyl lauryl phthalate, diisooctyl phthalate, butylcoconutalkyl phthalate, ditridecyl phthalate, dilauryl phthalate, diisodecyl phthalate, butylbenzyl phthalate, octyldecanoyl phthalate, dimethylglycol phthalate, ethylphthalyl ethylene glycolate, methylphthalyl ethylene glycolate, butylphthalyl ethylene glycolate, dinonyl phthalate, diheptyl phthalate, octyldecyl phthalate, ditridecyl phthalate, dicapryl phthalate, bis(3,5,5-trimethylhexyl) phthalate, isooctylisodecyl phthalate, bis(di ethyleneglycolmonomethylether) phthalate, and benzphenol; aliphatic esters (in the form of mono-, di-, or polyester of higher fatty acid having 8 or more carbons, preferably 8-30 carbons with di-, tri-, or polyhydric alcohol), such as glycerin monostearate, glycerin 12-hydroxy stearate, glycerin distearate, diglycerin monostearate, tetraglycerin monostearate, glycerin monolaurate, diglycerin monolaurate, tetraglycerin monolaurate, polypropylene adipate, diisodecyl adipate, bis(2-methylhexyl) adipate, dicapryl adipate, diisooctyl adipate, octyldecyl adipate, isooctylisodecyl adipate, dibutyl fumarate, dioctylfumarate, triethyl citrate, acetyltriethyl citrate, tributyl citrate, and acetyltributyl citrate; or phosphate esters, such as tricresyl phosphate, phenyldicresyl phosphate, xylenyldicresyl phosphate, cresyldixylenyl phosphate, triphenyl phosphate, tributyl phosphate, trichloroethyl phosphate, trioctyl phosphate, tributyl phosphate, trichloroethyl phosphate, trioctyl phosphate, triethyl phosphate, and arylalyl phosphate; and epoxy compounds thereof, such as butylepoxy stearate, octylepoxy stearate, epoxybutyl oleate, epoxidized butyl oleate, epoxidized soybean oil, epoxidized linseed oil, epoxidized alkyl oil, and epoxidized alkyl oil alcohol ester; and mixtures thereof.

In a particular embodiment, the plasticizer is selected from the group consisting of alkyl adipates, alkyl phthalates, alkyl azelates, alkyl benzoates, alkyl citrates, soy and linseed oils and mixtures thereof.

In a particular embodiment, the plasticizer is dialkyl phthalate. In another particular embodiment, the plasticizer includes at least one alkyl aromatic sulfonamide containing from 6 to 40 carbon atoms total and at least six carbon atoms in the alkyl group; and/or at least one different polyether aromatic sulfonamide different and having the following structure:

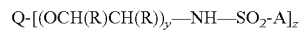

where Q is selected from the following structures:

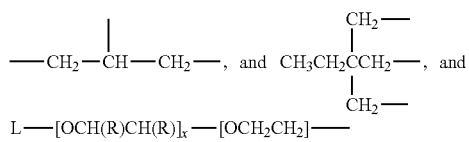

L——[OCH(R)CH(R)]$_x$——[OCH$_2$CH$_2$]——

A is an aromatic group containing from 6 to 39 carbon atoms; L is an alkyl group containing from 1 to 20 carbon atoms or A-SO$_2$—NHCH(CH$_3$)CH$_2$—; R is independently hydrogen or linear or branched alkyl groups having from 1 to 4 carbon atoms; x ranges from 0 to 40; y ranges from 2 to 40; z ranges from 1 to 3; and a ranges from 0 to 40.

In another particular embodiment, the plasticizer is selected from C$_3$-C$_{10}$ dialkyl adipates, C$_3$-C$_{10}$ dialkyl phthalates, and acetyl tributyl citrate and, more particularly, the plasticizer is selected from dibutyl phthalate, bis(2-ethylhexyl) phthalate, diisopropyl adipate, dibutyl adipate, bis(2-ethylhexyl) adipate and acetyl tributyl citrate, and mixtures thereof.

Other plasticized polyurethane materials suitable for the present invention include the gel compositions based on reaction products of polyols and polyisocyanates disclosed in U.S. Pat. No. 6,322,650.

Suitable plasticizers also include esters of polybasic, preferably dibasic carboxylic acids with monohydric alcohols. The acid component of such esters may be derived for example from succinic acid, isophthalic acid, trimellitic acid, phthalic anhydride, tetrahydrophthalic anhydride and/or hexahydrophthalic anhydride, endomethylenetetrahydrophthalic anhydride, glutaric anhydride, maleic anhydride, fumaric acid and/or dimerized and/or trimerized fatty acids such as oleic acid, optionally mixed with monomeric fatty acids. The alcohol component of such esters may be derived for example from branched and/or aliphatic alcohols with 1 to 20 C atoms, such as methanol, ethanol, propanol, isopropanol. n-butanol, sec-butanol, tert-butanol, the various isomers of pentyl alcohol, hexyl alcohol, octyl alcohol (e.g., 2-ethylhexanol), nonyl alcohol, decyl alcohol, lauryl alcohol, myristyl alcohol, cetyl alcohol, stearyl alcohol and/or from naturally occurring fatty alcohols and wax alcohols or from fatty alcohols and wax alcohols obtained by hydrogenation of naturally occurring carboxylic acids. Also suitable as alcohol component are cycloaliphatic and/or aromatic hydroxy compounds, for example cyclohexanol and its homologues, phenol, cresol, thymol, carvacrol, benzyl alcohol and/or phenylethanol. Esters of the aforementioned alcohols with phosphoric acid are further suitable as plasticizers. Optionally, phosphoric acid esters of halogenated alcohols, such as trichloroethyl phosphate, may be used.

Flexible plasticized polyurethane foams are also suitable and typically include a foamable polyurethane compound produced by the reaction of a polyol and toluene diisocyanate, an amount of a non-halogen containing foaming agent sufficient to produce a foam from said polyurethane compound and a non-halogen containing plasticizer selected from the group consisting of phthalate plasticizers and phosphate ester plasticizers. The non-halogen containing foaming agent may be water or a non-halogen containing gas and is preferably water, more preferably a phosphate ester and, more preferably, selected from the group consisting of 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate, isopropylated triphenyl phosphate, and mixtures thereof. If the flexible plasticized polyurethane foam is a phthalate plasticizer, it is preferably diisononyl phthalate, dihexyl phthalate, diheptyl phthalate, butyl octyl phthalate, linear dialkyl phthalate wherein said alkyl groups are independently carbon chains having from seven to eleven carbon atoms, and butyl cyclohexyl phthalate, or a mixture thereof. The non-halogen containing plasticizer may also be an alkyl aryl phthalate, and preferably is alkyl aryl phthalate is selected from the group consisting of butyl benzyl phthalate, alkyl benzyl phthalate wherein said alkyl group has a carbon chain having from seven to nine carbon atoms, and texanol benzyl phthalate.

The flexible plasticized polyurethane foam may also comprise a foamable polyurethane compound produced by the reaction of a polyol and toluene diisocyanate, an amount of water sufficient to produce a foam from said polyurethane compound and phthalate plasticizer selected from the group consisting of butyl benzyl phthalate, alkyl benzyl phthalate wherein said alkyl group has a carbon chain having from seven to nine carbon atoms, texanol benzyl phthalate, diisononyl phthalate, dihexyl phthalate, diheptyl phthalate, butyloctyl phthalate, linear dialkyl phthalate wherein said alkyl groups are independently carbon chains having from seven to eleven carbon atoms, and butyl cyclohexyl phthalate. The flexible plasticized polyurethane foam may further comprise a foamable polyurethane compound produced by the reaction of a polyol and toluene diisocyanate, an amount of water sufficient to produce a foam from said polyurethane compound and a phosphate ester plasticizer selected from the group consisting of 2-ethylhexyl diphenyl phosphate, isodecyl diphenyl phosphate, mixed dodecyl and tetradecyl diphenyl phosphate, mixed dodecyl and tetradecyl diphenyl phosphate, trioctyl phosphate, tributyl phosphate, butylphenyl diphenyl phosphate and isopropylated triphenyl phosphate.

The plasticized polyurethane composition may further comprise plasticizers so as to modify the rheological properties to a desired consistency. Such materials should be free of water, inert to isocyanate groups and compatible with a polymer. Suitable plasticizers include, but are not limited to, alkyl phthalates, such as dioctylphthalate or dibutylphthalate, partially hydrogenated terpene, trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired properties and which is sufficient to disperse the catalyst in the system.

Other plasticized polyurethane materials suitable for the present invention include the polysulfide-based polyurethanes disclosed in U.S. Pat. No. 6,322,650; the hydroxy acid ester plasticized urethane elastomers disclosed in U.S. Pat. No. 6,322,650; and thermoplastic polymer compositions disclosed in U.S. Pat. No. 6,322,650. The entire disclosure of each of these references is hereby incorporated herein by reference.

Also particularly suitable are the plasticized polyurethanes disclosed in U.S. Pat. No. 8,034,873, the entire disclosure of which is hereby incorporated herein by reference.

Non-volatile ester plasticizers are also suitable for the present invention.

The invention is also directed to the use of a plasticized polyurethane gel. The plasticized polyurethane gels can be provided in various hardnesses. The plasticized polyurethane gel is preferably a soft elastomer with high sol (plasticizer) fraction which can include a high molecular weight triol (MW greater than 6000) and a diisocyanate. The polyol can be, for example, ARCOL® E-452 polyol, commercially available from Bayer MaterialScience, and the plasticizer can be, for example, a Paraffin oil or dipropylene glycol dibenzoate.

The plasticized polyurethane gels may be blended with an oil-extended elastomer prepared from oil (e.g., KAYDOL® mineral oil, commercially available from Sonneborn) and a styrene ethylene butadiene styrene triblock medium molecular weight rubber polymer (e.g., KRATON® 1650 M, commercially available from Kraton Performance Polymers Inc.). Other additives, such as plastic, expanded, resilient, hollow microspheres, e.g., EXPANCEL® 091 DE80 expanded glass hollow microspheres, commercially available from AkzoNobel, or a blowing agent can be added to the gel to reduce weight or the gel can be frothed with air using ultrasonic cavitation.

The plasticized polyurethane composition may be foam-based. The foam can be comprised of a polyurethane foam with hollow microspheres or a blowing agent. In another embodiment, the foam can be comprised of a polyol, anti-foam agent, catalyst, and isocyanate. The foam can be made of many standard foams that are available. In a particular embodiment, the foam has a Shore C hardness of about 2 to 80, or a Shore C hardness of about 10 to 50.

Thermoplastic polyurethanes suitable for blending with plasticizers for use with the present invention are disclosed in U.S. Pat. No. 6,166,135, the entire disclosure of which is hereby incorporated herein by reference.

According to the present invention, the viscosity of the plasticized composition can be adjusted by means of the use of at least 5 parts by weight of thickening additive per 100 parts by weight of polyol and, preferably, 30 to 110 parts by weight.

Esters of divalent or polyvalent carboxylic acids are also plasticizers that can be employed according to the present invention. Examples of such polycarboxylic acids include, but are not limited to, are succinic, phthalic, trimellitic and fumaric acids, dimeric and trimeric fatty acids like oleic acid, optionally mixed with monomeric fatty acids, and phthalic, tetrahydro- and hexahydrophthalic, endomethyl-enetetrahydrophthalic, glutaric and maleic anhydrides. Among the alcohols which esterify the acids and the anhydrides will be mentioned branched or unbranched aliphatic alcohols which have a carbon number ranging from 1 to 20, such as methanol, ethanol, propanol, iso-propanol, n-buta-nol, sec-butanol, tert-butanol, the various isomers of pentyl alcohol, of hexyl alcohol, of octyl alcohol (for example 2-ethylhexanol), of nonyl alcohol, of decyl alcohol, of lauryl alcohol, of myristyl alcohol, of cetyl alcohol and of stearyl alcohol, as well as the alcohols from fatty substances and from waxes of natural origin, or obtained by hydrogenation of carboxylic acids of natural origin. Cycloaliphatic alcohols such as cyclohexanol and its homologues can be employed. It is also possible to employ aromatic hydroxy compounds such as phenol, cresol, thymol, carvacrol, benzyl alcohol and phenylethyl alcohol.

Phosphorus-containing plasticizers can also be employed, such as the esters of branched or unbranched aliphatic, cycloaliphatic or aromatic alcohols referred to above and of orthophosphoric acid. Polymeric plasticizers can also be employed, such as, for example, the polyesters of adipic acid, sebacic acid, or phthalic acid, as well as polybutadiene, polyisoprene and polyisobutene oligomers.

Other plasticizers suitable for the invention include, but are not limited to, phthalates, adipates, sebacates, azelates, trimellitates, glutarates, benzoates, alkyl alcohols, phosphates, and mixtures thereof.

The plasticized polyurethane composition optionally includes one or more fillers and/or additives. Suitable fillers and additives include, but are not limited to, pigments, ground calcium carbonates, precipitated calcium carbonates, clays, silicas, talc and mica, adhesion promoters, ultra violet light stabilizers, anti-oxidants, catalysts, theological modifiers, biocides, corrosion inhibitors, dehydrators, organic solvents, colorants, and perfumes.

Other suitable materials for blending with the plasticized polyurethanes of the present invention include diurethanes such as those disclosed in U.S. Pat. No. 4,824,888. Diurethanes generally correspond to one of two general formulas based on isocyanate-terminated prepolymers of difunctional and trifunctional polyether or polyester polyols and/or polyvinylchloride swellable copolymers of vinyl chloride with monomers from the group vinyl acetate, vinyl propionate and alkyl acrylates. Diurethanes can be prepared by the reaction of diols with monoisocyanates and diurethanes prepared from symmetrical diisocyanates with polyether monoalcohols. In particular, the monoalcohols are monofunctional polypropylene glycol monoalkyl ethers having a molecular weight of about 500 to 2000. These diurethanes are also suitable stabilizing agents for isocyanate-terminated polyurethane prepolymers, and for polyvinyl chloride homopolymer or copolymer plastisols.

Other suitable materials include moisture curing sealing and/or adhesive compositions based on alkoxysilane-terminated polyurethanes which contain diurethanes as plasticizers. These types of diurethanes are prepared from either diol mixtures and monofunctional isocyanates wherein substantially all the free hydroxyl groups are reacted, or from diisocyanates and monofunctional alcohols wherein substantially all the free isocyanate groups are reacted. Other suitable urethane plasticizers are disclosed in, for example, U.S. Pat. Nos. 4,123,413 and 4,482,408, which are incorporated herein, in their entirety, by reference. These urethane plasticizers are generally prepared by reaction of an alcohol or a phenol with an isocyanate, from amines and chloroformates, or from chloroformamides and alcohols or phenols in the presence of acid binding agents. A preferred urethane plasticizer is octyldecyl-butyl urethane which is prepared by reacting an equimolar mixture of octyldecyl isocyanate and n-butyl alcohol, for example.

Useful polyurethane plasticizers according to the present invention are also based on monoisocyanates or diisocyanates, and at least one compound selected from the group consisting of monoalcohols, polyether polyols, and mixtures thereof, having a molecular weight of more than about 4,000. They can be prepared by either adding the alcohol(s) and/or polyether polyol(s) to the monoisocyanates or diisocyanates, or by addition of the monoisocyanates or diisocyanates to the monofunctional alcohol(s) and/or polyether polyol(s).

The present invention provides a polyurethane dispersion comprising a plasticizer. The amount of plasticizer present in the polyurethane dispersion may be from about 1 to 30 parts per hundred, based on dry polyurethane weight, and preferably from about 5 to 25 parts per hundred. Typical of the plasticizers which may be used in accordance with the present invention are phthalate plasticizers such as: dimethyl phthalate, diethyl phthalate, dimethoxy-ethyl phthalate, dibutyl phthalate, butyl cyclohexyl phthalate, butyl benzyl phthalate, dibutoxy ethyl phthalate, di-2-ethylbutyl phthalate, bis(diethylene glycol monoethyl ether) phthalate, di-n-hexyl phthalate, di-2-ethylhexyl phthalate, diiso-octyl phthalate, di-2-ethylhexyl hexahydrophthalate. Other suitable plasticizers include aromatic and alkyl phosphate esters and aromatic and aliphatic esters of diacids, such as esters of alkanedioic acids and especially esters of dibenzoic acid. Adipate and sebacate plasticizers may also be used in accordance with the present invention. These plasticizers may be used alone or in combination as a mixture of plasticizers.

Plasticized polyurethanes are further disclosed, for example, in U.S. Pat. Nos. 6,849,675 and 7,053,142, the entire disclosures of which are hereby incorporated herein by reference.

Golf Ball Applications

Golf balls of the present invention include a multi-layer core comprising an inner core layer, an outer core layer, and optionally one or more intermediate core layer(s). One or more of the core layers is formed from a plasticized polyurethane composition. Core layers that are formed from compositions other than the plasticized polyurethane composition may be formed from suitable golf ball compositions including, but not limited to, rubber compositions, ionomeric and non-ionomeric thermoplastic compositions.

Suitable rubber compositions include a base rubber selected from natural and synthetic rubbers, including, but not limited to, polybutadiene, polyisoprene, ethylene propylene rubber ("EPR"), ethylene propylene diene rubber ("EPDM"), styrene butadiene rubber, styrenic block copolymer rubber, butyl rubber, halobutyl rubber, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polystyrene elastomers, polyethylene elastomers, polyurethane elastomers, polyurea elastomers, metallocene-catalyzed elastomers and plastomers, polyalkenamer, phenol formaldehyde, melamine formaldehyde, polyepoxide, polysiloxane, alkyd, polyisocyanurate, polycyanurate, polyacrylate, and combinations of two or more thereof. Diene rubbers are preferred, particularly polybutadiene, styrene butadiene, acrylonitrile butadiene, and mixtures of polybutadiene with other elastomers wherein the amount of polybutadiene present greater than 40 wt % based on the total polymeric weight of the mixture.

Non-limiting examples of suitable commercially available base rubbers are Buna CB high-cis neodymium-catalyzed polybutadiene rubbers, such as Buna CB 23, Buna CB24, and Buna CB high-cis cobalt-catalyzed polybutadiene rubbers, such as Buna CB 1203, 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistalon® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Plioflex PLF 1502, commercially available from Goodyear Chemical; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; Hypalon® chlorosulfonated polyethylene rubbers, commercially available from E. I. du Pont de Nemours and Company; and Goodyear Budene® 1207 polybutadiene, commercially available from Goodyear Chemical. In a particular embodiment, the core is formed from a rubber composition comprising as the base rubber a blend of Neodene BR 40 polybutadiene, Budene® 1207 polybutadiene, and Buna SB 1502 styrene butadiene rubber. In another particular embodiment, the core is formed from a rubber composition comprising as the base rubber a blend of Neodene BR 40 polybutadiene, Buna CB 1221, and core regrind.

The rubber is crosslinked using, for example, a peroxide or sulfur cure system, C—C initiators, high energy radiation sources capable of generating free radicals, or a combination thereof. The rubber composition optionally includes one or more of the following: scorch retarder, antioxidant, soft and fast agent, filler, processing aid, processing oil, coloring agent, fluorescent agent, chemical blowing and foaming agent, defoaming agent, stabilizer, softening agent, impact modifier, free radical scavenger, and antiozonant (e.g., p-phenylenediames). Suitable types and amounts of rubber, initiator agent, coagent, filler, and additives are more fully described in, for example, U.S. Pat. Nos. 6,566,483, 6,695, 718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Suitable ionomer compositions include partially neutralized ionomers and highly neutralized ionomers, including ionomers formed from blends of two or more partially neutralized ionomers, blends of two or more highly neutralized ionomers, and blends of one or more partially neutralized ionomers with one or more highly neutralized ionomers. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. As used herein, "(meth) acrylic acid" means methacrylic acid and/or acrylic acid. Likewise, "(meth)

acrylate" means methacrylate and/or acrylate. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Particularly preferred O/X/Y-type copolymers are ethylene/(meth) acrylic acid/n-butyl (meth) acrylate, ethylene/(meth) acrylic acid/isobutyl (meth) acrylate, ethylene/(meth) acrylic acid/methyl (meth) acrylate, and ethylene/(meth) acrylic acid/ethyl (meth) acrylate. The acid is typically present in the acid copolymer in an amount of 6 wt % or greater, or 9 wt % or greater, or 10 wt % or greater, or 11 wt % or greater, or 15 wt % or greater, or 16 wt % or greater, or 19 wt % or greater, or 20 wt % or greater, or in an amount within a range having a lower limit of 1 or 4 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. In a particular embodiment, less than 40% of the acid groups present in the composition are neutralized. In another particular embodiment, from 40% to 60% of the acid groups present in the composition are neutralized. In another particular embodiment, from 60% to 70% of the acid groups present in the composition are neutralized. In another particular embodiment, from 60% to 80% of the acid groups present in the composition are neutralized. In another particular embodiment, from 70% to 80% of the acid groups present in the composition are neutralized. In another embodiment, from 80% to 100% of the acid groups present in the composition are neutralized. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, tin, lithium, and rare earth metals. In a particular embodiment, the ionomer composition includes a bimodal ionomer, for example, DuPont® AD1043 ionomers, and the ionomers disclosed in U.S. Patent Application Publication No. 2004/0220343 and U.S. Pat. Nos. 6,562,906, 6,762,246 and 7,273,903, the entire disclosures of which are hereby incorporated herein by reference. Suitable ionomers are further disclosed, for example, in U.S. Patent Application Publication Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

Suitable ionomer compositions also include blends of one or more partially- or fully-neutralized polymers with additional thermoplastic and thermoset materials, including, but not limited to, non-ionomeric acid copolymers, engineering thermoplastics, fatty acid/salt-based highly neutralized polymers, polybutadienes, polyurethanes, polyureas, polyesters, polycarbonate/polyester blends, thermoplastic elastomers, maleic anhydride-grafted metallocene-catalyzed polymers, and other conventional polymeric materials. Suitable ionomeric compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference.

Also suitable are polyester ionomers, including, but not limited to, those disclosed, for example, in U.S. Pat. Nos. 6,476,157 and 7,074,465, the entire disclosures of which are hereby incorporated herein by reference.

Also suitable are thermoplastic elastomers comprising a silicone ionomer, as disclosed, for example, in U.S. Pat. No. 8,329,156, the entire disclosure of which is hereby incorporated herein by reference.

Also suitable are the following non-ionomeric polymers, including homopolymers and copolymers thereof, as well as their derivatives that are compatibilized with at least one grafted or copolymerized functional group, such as maleic anhydride, amine, epoxy, isocyanate, hydroxyl, sulfonate, phosphonate, and the like:
  (a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274, 298, and 6,001,930, the entire disclosures of which are hereby incorporated herein by reference, and blends of two or more thereof;
  (b) polyamides, polyamide-ethers, and polyamide-esters, and those disclosed in U.S. Pat. Nos. 6,187,864, 6,001, 930, and 5,981,654, the entire disclosures of which are hereby incorporated herein by reference, and blends of two or more thereof;
  (c) polyurethanes, polyureas, polyurethane-polyurea hybrids, and blends of two or more thereof;
  (d) fluoropolymers, such as those disclosed in U.S. Pat. Nos. 5,691,066, 6,747,110 and 7,009,002, the entire disclosures of which are hereby incorporated herein by reference, and blends of two or more thereof;
  (e) non-ionomeric acid polymers, such as E/X- and E/X/Y-type copolymers, wherein E is an olefin (e.g., ethylene), X is a carboxylic acid such as acrylic, methacrylic, crotonic, maleic, fumaric, or itaconic acid, and Y is an optional softening comonomer such as vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons; and blends of two or more thereof;
  (f) metallocene-catalyzed polymers, such as those disclosed in U.S. Pat. Nos. 6,274,669, 5,919,862, 5,981, 654, and 5,703,166, the entire disclosures of which are hereby incorporated herein by reference, and blends of two or more thereof;
  (g) polystyrenes, such as poly(styrene-co-maleic anhydride), acrylonitrile-butadiene-styrene, poly(styrene sulfonate), polyethylene styrene, and blends of two or more thereof;
  (h) polypropylenes and polyethylenes, particularly grafted polypropylene and grafted polyethylenes that are modified with a functional group, such as maleic anhydride of sulfonate, and blends of two or more thereof;
  (i) polyvinyl chlorides and grafted polyvinyl chlorides, and blends of two or more thereof;
  (j) polyvinyl acetates, preferably having less than about 9% of vinyl acetate by weight, and blends of two or more thereof;

(k) polycarbonates, blends of polycarbonate/acrylonitrile-butadiene-styrene, blends of polycarbonate/polyurethane, blends of polycarbonate/polyester, and blends of two or more thereof;
(l) polyvinyl alcohols, and blends of two or more thereof;
(m) polyethers, such as polyarylene ethers, polyphenylene oxides, block copolymers of alkenyl aromatics with vinyl aromatics and poly(amic ester)s, and blends of two or more thereof;
(n) polyimides, polyetherketones, polyamideimides, and blends of two or more thereof;
(o) polycarbonate/polyester copolymers and blends; and
(p) combinations of any two or more of the above thermoplastic polymers.

Thermoplastic core compositions optionally include one or more additives and/or fillers such as blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers.

Examples of commercially available thermoplastics suitable for forming the thermoplastic core layers include, but are not limited to, Pebax® thermoplastic polyether block amides, commercially available from Arkema Inc.; Surlyn® ionomer resins, Hytrel® thermoplastic polyester elastomers, and ionomeric materials sold under the trade names DuPont® HPF 1000, HPF 2000, HPF AD 1035, HPF AD 1040, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics.

In a particular embodiment, at least one core layer is formed from a blend of two or more ionomers. In a particular aspect of this embodiment, the blend is a 50 wt %/50 wt % blend of two different partially-neutralized ethylene/methacrylic acid copolymers.

In another particular embodiment, at least one core layer is formed from a blend of one or more ionomers and a maleic anhydride-grafted non-ionomeric polymer. In a particular aspect of this embodiment, the non-ionomeric polymer is a metallocene-catalyzed polymer. In another particular aspect of this embodiment, the blend includes a partially-neutralized ethylene/methacrylic acid copolymer and a maleic anhydride-grafted metallocene-catalyzed polyethylene.

In another particular embodiment, at least one core layer is formed from a composition selected from the group consisting of partially- and fully-neutralized ionomers optionally blended with a maleic anhydride-grafted non-ionomeric polymer; polyester elastomers; polyamide elastomers; and combinations of two or more thereof.

In another particular embodiment, at least one core layer is formed from an HNP composition, wherein the HNP composition is formed by blending an acid polymer, a non-acid polymer, a cation source, and a fatty acid or metal salt thereof, as disclosed, for example, in U.S. Patent Application Publication No. 2014/0113748, the entire disclosure of which is hereby incorporated herein by reference.

In another particular embodiment, at least one core layer is formed from a plasticized acid copolymer composition, a plasticized partially neutralized acid copolymer composition, or a plasticized HNP composition, as disclosed, for example, in U.S. patent application Ser. No. 14/460,416, U.S. patent application Ser. No. 14/490,976, U.S. patent application Ser. No. 14/576,800, and U.S. patent application Ser. No. 14/588,317, the entire disclosures of which are hereby incorporated herein by reference.

In another particular embodiment, at least one core layer is formed from a plasticized polyester composition, as disclosed, for example, in U.S. patent application Ser. No. 14/532,141, the entire disclosure of which is hereby incorporated herein by reference.

In another particular embodiment, at least one core layer is formed from a plasticized polyamide composition, as disclosed, for example, in U.S. patent application Ser. No. 14/309,066, U.S. patent application Ser. No. 14/330,189, U.S. patent application Ser. No. 14/527,835, and U.S. patent application Ser. No. 14/576,324, the entire disclosures of which are hereby incorporated herein by reference.

Suitable core layer compositions are further disclosed, for example, in U.S. Patent Publication No. 2003/0130434 and 2003/0144087, and U.S. Pat. Nos. 5,919,100, 6,653,382, 6,872,774, 7,074,137, and 7,300,364, the entire disclosures of which are hereby incorporated herein by reference.

The multi-layer core is enclosed with a cover, which may be a single-, dual-, or multi-layer cover. In a particular embodiment, the cover has an overall thickness of 0.010 or 0.020 or 0.025 or 0.030 or 0.040 or 0.045 or 0.050 or 0.060 or 0.070 or 0.075 or 0.080 or 0.090 or 0.100 or 0.150 or 0.200 or 0.300 or 0.500 inches, or an overall thickness within a range having a lower limit and an upper limit selected from these values.

Suitable cover materials include, but are not limited to, ionomer resins and blends thereof (e.g., Surlyn® ionomer resins and DuPont® HPF 1000, HPF 2000, HPF AD 1035, HPF AD 1040, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

Compositions comprising an ionomer or a blend of two or more ionomers are particularly suitable cover materials. Preferred ionomeric cover compositions include:
(a) a composition comprising a "high acid ionomer" (i.e., having an acid content of greater than 16 wt %), such as Surlyn® 8150 ionomer resin;
(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn® 8150 ionomer resin and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;
(c) a composition comprising a 50/45/5 blend of Surlyn® 8940 ionomer resin/Surlyn® 9650 ionomer resin/Nucrel® 960 acid copolymer resin, preferably having a material hardness of from 80 to 85 Shore C;
(d) a composition comprising a 50/25/25 blend of Surlyn® 8940 ionomer resin/Surlyn® 9650 ionomer resin/Surlyn® 9910 ionomer resin, preferably having a material hardness of about 90 Shore C;
(e) a composition comprising a 50/50 blend of Surlyn® 8940 ionomer resin/Surlyn® 9650 ionomer resin, preferably having a material hardness of about 86 Shore C;
(f) a composition comprising a blend of Surlyn® 7940 ionomer resin/Surlyn® 8940 ionomer resin, optionally including a melt flow modifier;
(g) a composition comprising a blend of a first high acid ionomer and a second high acid ionomer, wherein the first high acid ionomer is neutralized with a different cation than the second high acid ionomer (e.g., 50/50 blend of Surlyn® 8150 ionomer resin and Surlyn® 9150 ionomer resin), optionally including one or more melt flow modifiers such as an ionomer, ethylene-acid copolymer or ester terpolymer; and
(h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140 ionomer resin, 40-50 wt % Surlyn® 9120 ionomer resin, and 0-10 wt % Surlyn® 6320 ionomer resin).

Surlyn® 8150 ionomer resin, Surlyn® 8940 ionomer resin, and Surlyn® 8140 ionomer resin are different grades of E/MAA copolymer in which the acid groups have been partially neutralized with sodium ions. Surlyn® 9650 ionomer resin, Surlyn® 9910 ionomer resin, Surlyn® 9150 ionomer resin, and Surlyn® 9120 ionomer resin are different grades of E/MAA copolymer in which the acid groups have been partially neutralized with zinc ions. Surlyn® 7940 ionomer resin is an E/MAA copolymer in which the acid groups have been partially neutralized with lithium ions. Surlyn® 6320 ionomer resin is a very low modulus magnesium ionomer with a medium acid content. Nucrel® 960 acid copolymer resin is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, particularly to manipulate product properties. Examples of suitable non-ionic thermoplastic resins include, but are not limited to, polyurethane, polyether-ester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Ionomer golf ball cover compositions may include a flow modifier, such as, but not limited to, Nucrel® acid copolymer resins, and particularly Nucrel® 960 acid copolymer resin. Nucrel® acid copolymer resins are commercially available from E. I. du Pont de Nemours and Company.

Polyurethanes, polyureas, and blends and hybrids of polyurethane/polyurea are also particularly suitable for forming cover layers. Suitable polyurethanes are further disclosed, for example, in U.S. Pat. Nos. 5,334,673, 6,506,851, 6,756,436, 6,867,279, 6,960,630, and 7,105,623, the entire disclosures of which are hereby incorporated herein by reference. Suitable polyureas are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the cover is a single layer, preferably formed form a composition selected ionomer compositions, polyurethanes, polyureas, and blends and hybrids of polyurethane/polyurea. The single layer cover preferably has an outer surface hardness of 65 Shore D or less, or 60 Shore D or less, or 45 Shore D or less, or 40 Shore D or less, or an outer surface hardness of 25 Shore D or 30 Shore D or 35 Shore D or 40 Shore D, or an outer surface hardness within a range having a lower limit and an upper limit selected from these values.

In another particular embodiment, the cover is a dual- or multi-layer cover comprising an inner cover layer, an outer cover layer, and optionally one or more intermediate cover layers. In a particular aspect of this embodiment, the inner cover layer or optional intermediate cover layer is formed from an ionomer composition and the outer cover layer is formed from a polyurethane or polyurea composition.

Multi-Layer Core Construction

A golf ball having a multi-layer core and a cover enclosing the core is disclosed. The multi-layer core comprises an inner core layer, an outer core layer, and optionally one or more intermediate core layer(s).

Multi-layer cores of the present invention have an overall diameter of 1.000 or 1.300 or 1.400 or 1.500 or 1.510 or 1.530 or 1.550 or 1.570 or 1.580 or 1.590 or 1.600 or 1.610 or 1.620 or 1.630 or 1.640 inches, or an overall diameter within a range having a lower limit and an upper limit selected from these values.

The inner core layer has a diameter of 0.500 inches or greater, or 0.750 inches or greater, or 0.800 inches or greater, or 0.900 inches or greater, or 1.000 inches or greater, or 1.150 inches or greater, or 1.250 inches or greater, or 1.350 inches or greater, or 1.390 inches or greater, or 1.450 inches or greater, or a diameter of 0.250 or 0.500 or 0.750 or 0.800 or 0.900 or 1.000 or 1.100 or 1.150 or 1.200 or 1.250 or 1.300 or 1.350 or 1.390 or 1.400 or 1.440 or 1.450 or 1.460 or 1.490 or 1.500 or 1.550 or 1.580 or 1.600 inches, or a diameter within a range having a lower limit and an upper limit selected from these values.

The outer core layer has a thickness of 0.010 or 0.020 or 0.025 or 0.030 or 0.035 or 0.040 or 0.045 or 0.050 or 0.055 or 0.060 or 0.065 or 0.070 or 0.075 or 0.080 or 0.100 or 0.150 or 0.200 or 0.250 or 0.275 or 0.300 or 0.350 inches, or a thickness within a range having a lower limit and an upper limit selected from these values.

Each optional intermediate core layer has a thickness of 0.005 or 0.010 or 0.020 or 0.030 or 0.040 or 0.050 or 0.060 or 0.070 or 0.080 or 0.090 or 0.100 inches, or a thickness within a range having a lower limit and an upper limit selected from these values.

In a particular embodiment, the core comprises an inner core layer formed from a rubber composition and an outer core layer formed from a plasticized polyurethane composition.

In another particular embodiment, the core comprises an inner core layer formed from a plasticized polyurethane composition and an outer core layer formed from a rubber composition.

In another particular embodiment, the core comprises an inner core layer formed from a first rubber composition, an outer core layer formed from a second rubber composition, and an intermediate layer disposed between the inner core layer and the outer core layer and formed from a plasticized polyurethane composition.

In another particular embodiment, the core comprises an inner core layer formed from a thermoplastic composition and an outer core layer formed from a thermoplastic plasticized polyurethane composition.

In another particular embodiment, the core comprises an inner core layer formed from a rubber composition and an outer core layer formed from a thermoplastic plasticized polyurethane composition.

In another particular embodiment, the core comprises a layer formed from a first plasticized polyurethane composition; a layer formed from a second plasticized polyurethane composition; and, optionally, a layer formed from a composition selected from rubber compositions, ionomeric and non-ionomeric thermoplastic compositions; wherein the first plasticized polyurethane composition has a higher Shore C hardness and a higher flexural modulus than the second plasticized polyurethane composition.

In another particular embodiment, the core comprises a layer formed from a first plasticized polyurethane composition; a layer formed from a second plasticized polyurethane composition; and, optionally, a layer formed from a composition selected from rubber compositions, ionomeric and non-ionomeric thermoplastic compositions; wherein the second plasticized polyurethane composition has a higher Shore C hardness and a higher flexural modulus than the first plasticized polyurethane composition.

In another particular embodiment, the core comprises a layer formed from a plasticized polyurethane composition; a layer formed from a polyurethane composition substantially free of plasticizer, i.e., including from 0 to less than 0.5 wt % of a plasticizer, based on the combined weight of the polyurethane and the plasticizer; and a layer formed from a rubber composition. In a particular aspect of this embodiment, the inner core layer is formed from the plasticized polyurethane composition, the intermediate core layer is formed from the polyurethane composition substantially free of plasticizer, and the outer core layer is formed from the rubber composition. In another particular aspect of this embodiment, the inner core layer is formed from the rubber composition, the intermediate core layer is formed from the plasticized polyurethane composition, ant the outer core layer is formed from the polyurethane composition substantially free of plasticizer.

In another particular embodiment, the core comprises a layer formed from a highly neutralized polymer composition; a layer formed from a plasticized polyurethane composition; and a layer formed from a rubber composition.

In another particular embodiment, the core comprises a layer formed from a rubber composition; a layer formed from a plasticized highly neutralized polymer composition; and a layer formed from a plasticized polyurethane composition.

In another particular embodiment, the core comprises a layer formed from a first rubber composition; a layer formed from a plasticized polyurethane composition; and a layer formed from a second rubber composition. The first rubber composition can be the same as or a different composition than the second rubber composition.

In another particular embodiment, the core comprises a layer formed from a plasticized polyurethane composition; a layer formed from an ionomer composition; and a layer formed from a rubber composition. In a particular aspect of this embodiment, the inner core layer is formed from the plasticized polyurethane composition and the outer core layer is formed from the rubber composition. In another particular aspect of this embodiment, the inner core layer is formed from the rubber composition and the outer core layer is formed from the plasticized polyurethane composition.

In another particular embodiment, the core comprises a layer formed from a first polyurethane composition, a layer formed from a second polyurethane composition, and a layer formed from an ionomer composition, wherein the first and/or the second polyurethane composition is a plasticized polyurethane composition.

Core layers of the present invention may have a zero or negative or positive hardness gradient. A hardness gradient is defined by hardness measurements made at the surface of the layer (e.g., center, outer core layer, etc.) and radially inward towards the center of the ball, typically at 2 mm increments. For purposes of the present invention, "negative" and "positive" refer to the result of subtracting the hardness value at the innermost portion of the golf ball component from the hardness value at the outer surface of the component. For example, if the outer surface of a solid core has a lower hardness value than the center (i.e., the surface is softer than the center), the hardness gradient will be deemed a "negative" gradient. In measuring the hardness gradient of a core, the center hardness is first determined according to the procedure above for obtaining the center hardness of a core. Once the center of the core is marked and the hardness thereof is determined, hardness measurements at any distance from the center of the core may be measured by drawing a line radially outward from the center mark, and measuring and marking the distance from the center, typically in 2 mm increments. All hardness measurements performed on a plane passing through the geometric center are performed while the core is still in the holder and without having disturbed its orientation, such that the test surface is constantly parallel to the bottom of the holder. The hardness difference from any predetermined location on the core is calculated as the average surface hardness minus the hardness at the appropriate reference point, e.g., at the center of the core for a single, solid core, such that a core surface softer than its center will have a negative hardness gradient. Hardness gradients are disclosed more fully, for example, in U.S. patent application Ser. No. 11/832,163, filed on Aug. 1, 2007; Ser. No. 11/939,632, filed on Nov. 14, 2007; Ser. No. 11/939,634, filed on Nov. 14, 2007; Ser. No. 11/939,635, filed on Nov. 14, 2007; and Ser. No. 11/939,637, filed on Nov. 14, 2007; the entire disclosure of each of these references is hereby incorporated herein by reference.

EXAMPLES

The examples below are for illustrative purposes only. In no manner is the present invention limited to the specific disclosures therein.

The following commercially available materials were used in the below examples:

Elastollan® 1154D53 thermoplastic polyurethane elastomer,

Elastollan® 1190A10 thermoplastic polyurethane elastomer, and

Elastollan® 1195A10 thermoplastic polyurethane elastomer, commercially available from BASF;

Jeffsol™ PC propylene carbonate, commercially available from Huntsman Corp.; and Benzoflex™ 284 plasticizer, commercially available from Eastman Chemical.

Various plasticized polyurethane compositions were melt blended using components as given in Table 1 below. The relative amounts of the components used are indicated in Table 1, and are reported in wt %, based on the combined weight of components 1 and 2.

TABLE 1

| Example | Component 1 | wt % | Component 2 | wt % |
|---|---|---|---|---|
| 1 | Elastollan 1154D53 | 100 | n/a | 0 |
| 2 | Elastollan 1154D53 | 90 | Jeffsol PC | 10 |
| 3 | Elastollan 1190A10 | 100 | n/a | 0 |
| 4 | Elastollan 1190A10 | 90 | Jeffsol PC | 10 |
| 5 | Elastollan 1190A10 | 90 | Benzoflex 284 | 10 |
| 6 | Elastollan 1195A10 | 100 | n/a | 0 |
| 7 | Elastollan 1195A10 | 90 | Jeffsol PC | 10 |

Solid spheres of each composition were injection molded, and the solid sphere COR, compression, outer surface Shore D hardness, and outer surface Shore C hardness of the resulting 1.550-inch diameter spheres were measured after two weeks at 23° C. and 50% relative humidity. The results are reported in Table 2 below.

TABLE 2

| Ex. | Solid Sphere COR | Solid Sphere Compression | Solid Sphere Shore D | Solid Sphere Shore C |
|---|---|---|---|---|
| 1 | 0.524 | 137 | 54.7 | 87.9 |
| 2 | 0.564 | 103 | 54.8 | 74.1 |
| 3 | 0.528 | 39 | 40.1 | 67.5 |
| 4 | 0.622 | −1 | 39.3 | 58.0 |
| 5 | 0.559 | 24 | 41.2 | 56.6 |
| 6 | 0.508 | 80 | 45.5 | 74.7 |
| 7 | 0.600 | 52 | 46.2 | 63.4 |

COR, as used herein, refers to coefficient of restitution, and is determined according to a known procedure wherein a golf ball or golf ball subassembly (e.g., a golf ball core) is fired from an air cannon at two given velocities and calculated at a velocity of 125 ft/s. Ballistic light screens are located between the air cannon and the steel plate at a fixed distance to measure ball velocity. As the ball travels toward the steel plate, it activates each light screen, and the time at each light screen is measured. This provides an incoming transit time period inversely proportional to the ball's incoming velocity. The ball impacts the steel plate and rebounds though the light screens, which again measure the time period required to transit between the light screens. This provides an outgoing transit time period inversely proportional to the ball's outgoing velocity. COR is then calculated as the ratio of the outgoing transit time period to the incoming transit time period, $COR=V_{out}/V_{in}=T_{in}/T_{out}$.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in *J. Dalton*.

The surface hardness of a sphere is obtained from the average of a number of measurements taken from opposing hemispheres, taking care to avoid making measurements on the parting line of the sphere or on surface defects, such as holes or protrusions. Hardness measurements are made pursuant to ASTM D-2240 "Indentation Hardness of Rubber and Plastic by Means of a Durometer." Because of the curved surface, care must be taken to insure that the sphere is centered under the durometer indentor before a surface hardness reading is obtained. A calibrated, digital durometer, capable of reading to 0.1 hardness units is used for all hardness measurements and is set to record the maximum hardness reading obtained for each measurement. The digital durometer must be attached to, and its foot made parallel to, the base of an automatic stand. The weight on the durometer and attack rate conform to ASTM D-2240.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a core and a cover, wherein the core comprises:
    an inner core layer formed from a composition comprising a polyurethane and from 2 wt % to 50 wt %, based on the total weight of the inner core layer composition, of a carbonate ester plasticizer selected from the group consisting of propylene carbonate, ethylene carbonate, and mixtures thereof, and
    an outer core layer formed from a rubber composition;
    wherein the surface hardness of the outer core layer is greater than the center hardness of the inner core layer.

2. The golf ball of claim 1, wherein the plasticizer is present in an amount of from 3 wt % to 40 wt %, based on the total weight of the inner core layer composition.

3. The golf ball of claim 1, wherein the inner core layer composition is a thermosetting composition.

4. The golf ball of claim 1, wherein the inner core layer composition is a thermoplastic composition.

* * * * *